Aug. 24, 1943.　　A. E. W. JOHNSON ET AL　　2,327,901

THRESHER CYLINDER

Filed June 30, 1941

Inventors
Arnold E. W. Johnson
Russel S. Acton
By Paul O. Pippel
atty.

Patented Aug. 24, 1943

2,327,901

UNITED STATES PATENT OFFICE 2,327,901

THRESHER CYLINDER

Arnold E. W. Johnson, Oak Park, and Russel D. Acton, Chicago, Ill., assignors to International Harvester Company, a corporation of New Jersey Application June 30, 1941, Serial No. 400,363

3 Claims. (Cl. 130—27)

This invention relates to improvements in threshers. More particularly the invention relates to novel beating members on threshing surfaces for thresher cylinders.

In present day harvesters and harvester threshers, it is desirable to use resilient beating members on the threshing cylinder, since most of all crops may be efficiently threshed by this type of beating member. However, it has been found that an ordinary resilient coating on the beating members will not efficiently thresh the crops because the resilient covering soon wears off on its outermost point which is the threshing edge. When the resilient covering becomes worn on its outer edge, the beating member must be replaced.

It is, therefore, an important object of the present invention to provide an improved threshing surface for thresher cylinders.

Another important object of the present invention is to provide an improved resilient covering for the beating member of a thresher cylinder which will efficiently thresh all grain and have longer life.

Another object of the present invention is to provide a rubber covering for a thresher cylinder which comprises masses of rubber so positioned and arranged thereon that the wind velocity and centrifugal force urges the greater mass of the rubber into a threshing position and forms a threshing edge.

Another object of the present invention is to provide a rubber covering for a threshing cylinder in which the greatest mass of the rubber is provided at the outermost point of the cylinder and which is placed in tension by the wind velocity and centrifugal force and urged outwardly when the cylinder is rotated.

By virtue of these particular objects and features, a longer lasting and more efficient beating member and threshing edge is provided for thresher cylinders.

According to the present invention, a rubber beating member or covering is provided on the leading face of the radially extending portions of the flail bars of the cylinder. The beating member comprises a plurality of masses of rubber formed into stepped surfaces, each of which has a greater thickness as it nears the outer portion of the cylinder.

These and other objects and advantages of the present invention will be apparent to those skilled in the art after a consideration of the following detailed description of the preferred structural embodiment taken in conjunction with the accompanying drawing.

Figure 1:
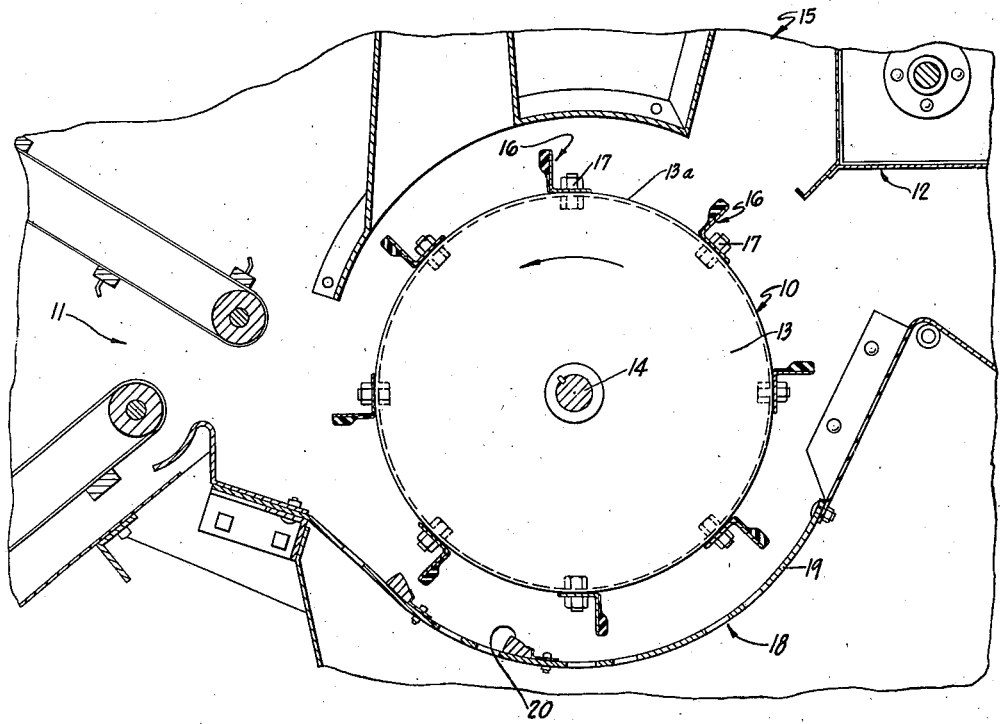
Figure 1 is a longitudinal sectional view through the separator and cylinder of a harvester and shows the novel resilient covering provided on the flail bars of the cylinder.
Figure 2:
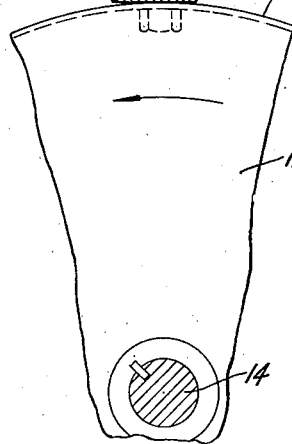
Figure 2 is an enlarged view of a portion of the cylinder on which is mounted one of the novel beating members.

Referring now to the drawing, more particularly to Figure 1, it will be seen that the thresher shown to illustrate the principles of the present invention comprises a cylinder 10, at the front of which is provided the usual feeder 11 and at the rear of which is provided the usual beater 12. The cylinder 10 comprises a plurality of radially extending plates 13 which are secured on a shaft 14 that is journaled in the sides of a separator 15 in the usual manner. The cylinder is driven in the direction of the arrows shown in Figures 1 and 2 from any suitable source of power for the thresher. In the present instance, each of the plates 13 is provided with a flange 13a to which a plurality of beating members or flail bars 16 is secured by means of bolts 17. Below the cylinder 10 is mounted a concave 18 which comprises a perforated plate 19 on which is mounted a plurality of concave elements 20.

The beating members or flail bars 16 consist of a radially extending portion 21a and a horizontal portion 21b. The portion 21b is secured to the flanges 13a by the bolts 17. Since the cylinder rotates in the direction of the arrows, the front of the radially extending portion 21a will be referred to as the leading face.

Figure 3:
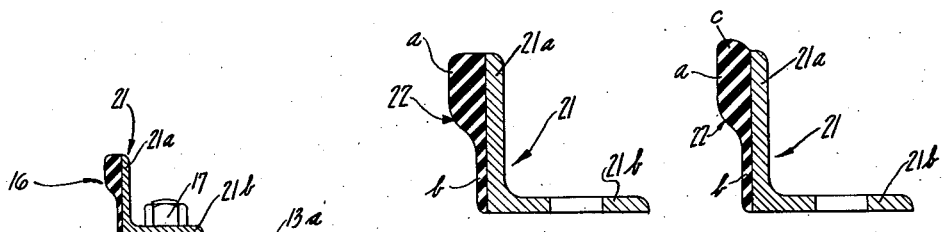
Figure 3 is an enlarged sectional view through one of the novel beating members and shows the position of the rubber covering when the cylinder is at rest; and, Figure 4 is a sectional view through one of the novel beating members and shows the position of the resilient beating member when the thresher cylinder is in operation.
Figure 4:
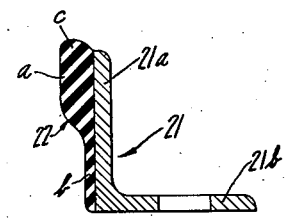

On the leading face is bonded a mass of rubber 22 providing a resilient threshing surface. It is to be noted from Figures 3 and 4 that the mass 22 is formed of a thick portion $a$ adjacent the outer part of the portion 21a and a thin portion $b$ adjacent the inner part of the portion 21a so that the mass 22 presents a stepped threshing surface composed of two flat surfaces generally parallel to one another and to the leading face of the portion 21a and a curved surface joining the two flat surfaces. By viture of this arrangement the rubber mass 22 acts during rotation of the cylinder 10 as shown in Figure 4; the thick portion a moves outwardly under centrifugal force so that a portion thereof indicated at c provides a threshing edge radially beyond the portion 21a, and thus the threshing action is increased. The portion a may move out as shown, because its thickness is relatively great in comparison with its width or radial dimension and is sufficiently greater than the thickness of the thin portion as to cause the center of mass of the thick portion to be spaced from the leading face of the portion 21a a greater amount than the flat surface of the thin portion and is sufficiently great in and of itself as to cause the center of mass to be spaced from the leading surface of the portion 21a sufficiently to have a good lever arm with respect to the outer surface of the portion 21a for outward movement of the thick portion a. Thus the thick portion has sufficient radial flexibility to move outwardly as shown in Figure 4. Incidentally, the curved surface between the thick and thin portions a and b provides a pocket in which the wind seats and aids the centrifugal force in moving the thick portion a outwardly. The thin portion b might be omitted except that it provides a threshing surface for whatever grain strikes the inner edge of the threshing element 21, and it increases the area over which the rubber mass 22 is bonded to the portion 21a and so gives greater assurance that the mass 22 will not be torn loose from the portion 21a. The curved surface joining the two flat surfaces of the thick and thin portions a and b prevents the localization of stress which might result in the formation of cracks between thick and thin portions.

As previously stated, the thick portion a moves outwardly under the action of centrifugal force produced by rotation of the cylinder and is placed under tension. The result is that the threshing surface of the portion a including the threshing edge indicated at c is toughened.

While only a preferred construction in which the principles of the present invention have been embodied is herein shown and described, it is to be understood that the invention is not to be limited to the specific details shown and described, but that, in effect, widely different means may be employed in the proper aspects of this invention.

What is claimed is:

1. In a thresher having a rotatable cylinder and a plurality of threshing elements extending radially outwardly therefrom and each having a leading radial face determined by the direction of rotation of the cylinder, the combination with each threshing element, of a resilient mass of rubber or the like bonded to the leading face of the threshing element and being composed of a thick portion adjacent the outer edge of the threshing element and a thin portion adjacent the inner edge of the threshing part so shaped as to provide flat surfaces generally parallel to one another and to the leading face and a curved surface joining the flat surfaces, the thickness of the thick portion being relatively great in comparison with the width or radial dimension thereof and being sufficiently greater than the thickness of the thin portion as to cause the center of mass of the thick portion to be spaced from the leading face a greater amount than the flat surface of the thin portion, whereby the thick portion moves outwardly under the action of centrifugal force due to rotation of the cylinder, causing its flat surface to be toughened for threshing because of tensioning of the thick portion due to its outward movement and presenting a threshing edge outward beyond the threshing element.

2. The combination with a rotatable threshing cylinder and a threshing element extending outwardly from the cylinder and having a radial face presented forward in the direction of rotation, of a resilient mass of rubber or the like bonded to the radial face of the element and being composed of a thick portion extending from the outer edge of the threshing element to a mid-point thereof and a thin portion extending from the said mid-point to the inner edge of the threshing element, there being a relatively great change in thickness at the said mid-point, the thickness of the thick portion being relatively great in comparison with the width thereof determined by the space between the outer edge and the said mid-point and being sufficiently greater than the thickness of the thin portion so as to cause the center of mass of the thick portion to be spaced from the said radially extending face of the threshing element a greater amount than the surface of the thin portion, whereby the thick portion moves outwardly under the action of the centrifugal force due to rotation of the cylinder, causing its surface to be toughened for threshing because of tensioning of the thick portion due to its outward movement and presenting a threshing edge radially outward beyond the threshing element.

3. The combination with a threshing cylinder adapted to be rotated in a certain direction and a threshing element extending outwardly from the threshing cylinder and having a radial face presented forward in the direction of rotation of the cylinder, and a resilient mass of rubber or the like bonded to the radial face of the element and being composed of a thick portion extending from the outer edge of the threshing element to a mid-point thereof and a thin portion extending from the said mid-point to the inner edge of the threshing element, so shaped as to provide flat surfaces generally parallel to one another and to the radially extending surface of the threshing element and a portion between the thick and thin portions at which the thickness changes abruptly, the thickness of the thick portion being relatively great in comparison with the width or radial dimension thereof and being sufficiently greater than the thickness of the thin portion as to cause the center of mass of the thick portion to be spaced from the leading face a greater amount than the flat surface of the thin portion, whereby the thick portion moves outwardly under the action of centrifugal force due to rotation of the cylinder, causing its flat surface to be toughened for threshing because of tensioning of the thick portion due to its outward movement and presenting a threshing edge outward beyond the threshing element.

ARNOLD E. W. JOHNSON.
RUSSEL D. ACTON.